(12) United States Patent  
Beck

(10) Patent No.: US 8,303,236 B2  
(45) Date of Patent: Nov. 6, 2012

(54) BULK SEED HANDLING AND DISPENSING SYSTEM

(76) Inventor: Tom J. Beck, Clarks, NE (US)

( * ) Notice: Subject to any disclaimer, the term of this patent is extended or adjusted under 35 U.S.C. 154(b) by 342 days.

(21) Appl. No.: 12/586,941

(22) Filed: Sep. 30, 2009

(65) Prior Publication Data

US 2011/0076123 A1 Mar. 31, 2011

(51) Int. Cl.
*B60P 1/00* (2006.01)
(52) U.S. Cl. .................. 414/526; 269/135; 414/523
(58) Field of Classification Search ............ 414/523, 414/526, 504, 501, 522; 269/43, 55, 56, 269/68, 86, 104, 107, 126, 134, 135, 150, 269/152, 153, 228, 260, 292, 293; 111/200, 111/925; 222/160, 166, 185.1, 424.5, 425, 222/426; 280/2, 79.11, 769, 182, 839, 33.997, 280/760
See application file for complete search history.

(56) References Cited

U.S. PATENT DOCUMENTS

| | | | | |
|---|---|---|---|---|
| 689,813 A * | 12/1901 | Decow et al. | .................. | 269/42 |
| 1,556,683 A * | 10/1925 | Fernald | ............................ | 33/669 |
| 2,563,418 A * | 8/1951 | Peter | ............................ | 414/523 |
| 2,679,748 A * | 6/1954 | Kent et al. | ........................ | 73/41 |
| 4,115,020 A * | 9/1978 | Langsford | .................. | 403/322.4 |
| 4,326,623 A * | 4/1982 | Zacharias et al. | .......... | 198/345.1 |
| 4,541,768 A * | 9/1985 | Walker et al. | ................. | 414/535 |
| 5,094,356 A | 3/1992 | Miller | | |
| 5,391,360 A * | 2/1995 | Kochte et al. | ................. | 422/292 |
| 5,520,495 A * | 5/1996 | Sukup | ........................... | 414/523 |
| 5,733,094 A * | 3/1998 | Bergkamp et al. | ............ | 414/526 |
| 5,785,481 A * | 7/1998 | Ockels | ......................... | 414/523 |
| 5,845,799 A | 12/1998 | Deaton | | |
| 6,010,022 A | 1/2000 | Deaton | | |
| 6,092,974 A * | 7/2000 | Roth | ............................. | 414/526 |
| 6,425,725 B1 * | 7/2002 | Ehlers | ......................... | 414/505 |
| 6,672,632 B1 * | 1/2004 | Speed et al. | .................... | 292/25 |
| 6,733,225 B1 * | 5/2004 | Barnett et al. | ................ | 414/420 |
| 6,971,324 B1 | 12/2005 | Beck | | |
| 6,994,039 B1 * | 2/2006 | Beck | ............................. | 111/200 |
| 7,086,342 B2 | 8/2006 | O'Neall et al. | | |
| 8,083,083 B1 * | 12/2011 | Mohns | .......................... | 220/1.5 |
| 2007/0200355 A1* | 8/2007 | Liang et al. | ..................... | 292/24 |

* cited by examiner

*Primary Examiner* — Saul Rodriguez
*Assistant Examiner* — Glenn Myers
(74) *Attorney, Agent, or Firm* — Dennis L. Thomte; Thomte Patent Law Office LLC

(57) ABSTRACT

A bulk seed handler and dispenser or seed tender is provided for transporting bulk seed containers and for dispensing the seed within the containers into planting equipment. The bulk seed handling and dispenser of this invention is comprised of a trailer having a plurality of bulk seed containers mounted thereon, each of which is in communication with seed inlet openings formed in the deck of the trailer. Means is provided for simultaneously clamping the opposite sides of the containers to the deck. When the seed containers are placed on the deck, the doors which provide access to the slide gates thereof are on the driver's side of the trailer. A pair of hydraulic cylinders pivotally interconnect the upper auger conveyor section to the lower auger conveyor section for pivotally moving the upper auger conveyor section between a stowed position and an operative position.

11 Claims, 6 Drawing Sheets

BULK SEED HANDLING AND DISPENSING SYSTEM

BACKGROUND OF THE INVENTION

1. Field of the Invention

This invention relates to a bulk seed handling and dispensing system and more particularly to a system wherein a plurality of bulk seed containers are selectively vertically removably positioned on the deck of the trailer. More particularly, this invention relates to a system wherein the seed containers are clamped or held down onto the deck of the trailer by means of hook members. Even more particularly, this invention relates to a system wherein the slide gates of the seed container are accessible from the driver's side of the trailer.

2. Description of the Related Art

Agricultural seeding machines such as a row crop planter or grain drill are used to place seeds at a desired depth within a plurality of parallel seed trenches. Historically, row crops such as corn are planted with row planters which normally consist of a plurality of spaced-apart planter units mounted on a supporting frame such as a tool bar or the like. Usually, each of the planter units includes a seed box or hopper thereon which must be filled with seed. Non-row crops such as wheat, soybeans, oats, barley, etc. are planted by means of grain drills. The grain drills include a seed hopper positioned thereon. In both types of planting, the seed boxes or hoppers must be filled with seed. In many cases, individual bags of seed are hand-carried to the planters with the seed being poured therefrom into the planter boxes or hoppers. In recent years, seed has been supplied to the farmers in bulk form, i.e., the seed is contained in large seed containers, sometimes called "totes", carried on a trailer or the like and is dispensed therefrom to the planter boxes or hoppers by an auger conveyor.

Applicant has previously received U.S. Pat. Nos. 6,971,324 and 6,994,039 on bulk seed handling and dispensing systems or seed tenders as they are sometimes called. Although the seed tenders of the above-identified patents have met with considerable success, it has been found that improvements may still be made on the same. In Applicant's previous seed tenders and in most prior art seed tenders, the deck of the trailer has upstanding and horizontally spaced-apart seed inlet openings formed thereon with the seed containers being slidably moved onto the deck of the trailer from one side thereof. As the seed containers are slidably moved onto the deck, the upper ends of the seed inlet openings are sometimes damaged. Further, it has been found that even a better way of holding or clamping the seed containers to the deck is desirable. Additionally, with the advent of larger diameter auger conveyors, it is desirable to provide a better way of pivotally moving the upper auger conveyor section with respect to the lower auger conveyor section. Even further, in most prior art seed tenders, the doors or slide gates of the seed containers are only accessible between the adjacent containers which makes it difficult to slidably move the slide gates of the containers.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A seed handling and dispensing apparatus for transporting bulk seed containers and for dispensing the seed within the containers into planting equipment is disclosed. The apparatus comprises a wheeled frame having a forward end, a rearward end, and first and second sides. The wheeled frame has a forwardly extending hitch for connection to a prime mover. A generally horizontally disposed deck is provided on the wheeled frame which defines a plurality of deck portions with each of the deck portions having a seed inlet opening provided thereon. The deck portions are adapted to have the bulk seed containers positioned thereon in a selectively removably vertical manner so as to communicate with the seed inlet openings. A first horizontally disposed and rotatable shaft is positioned below the deck inwardly of the first side of the wheeled frame with the first shaft having forward and rearward ends. The first shaft has a plurality of spaced-apart hold-down members secured thereto for rotation therewith. The deck has a plurality of first openings formed therein above the first hold-down members to permit the first hold-down members to pass therethrough. The first shaft is selectively rotatable to enable the first hold-down members to move between a first non-operative position and a second container hold-down position.

A second horizontally disposed and rotatable shaft is positioned below the deck inwardly of the second side of the wheeled frame with the second shaft having forward and rearward ends. The second shaft has a plurality of spaced-apart second hold-down members secured thereto for rotation therewith. The deck has a plurality of second openings formed therein above the second hold-down members to permit the second hold-down members to pass therethrough. The second shaft is selectively rotatable to enable the second hold-down members to move between a first non-operative position and a second container hold-down position. When the first and second hold-down members are in their container hold-down positions, they engage the bulk seed containers to secure the containers to the deck. The first and second shafts are interconnected so that they are rotated in unison by means of a crank positioned at the forward end of the second shaft.

In the preferred embodiment, the doors formed in the containers, which provided access to the slide gates thereon are positioned at the driver's side of the trailer. Further, the means which interconnects the upper and lower auger conveyor sections for pivotally moving the upper auger conveyor section with respect to the lower auger conveyor section comprises a pair of hydraulic cylinders pivotally secured thereto and extending therebetween.

It is therefore a principal object of the invention to provide an improved seed handling and dispensing apparatus for transporting bulk seed containers and for dispensing the seed within the containers into planting equipment.

A further object of the invention is to provide a seed handling and dispensing apparatus of the type described wherein the containers are vertically removably positioned on the deck so as to communicate with seed inlet openings provided on the deck of the trailer.

A further object of the invention is to provide a seed handling and dispensing apparatus of the type described wherein both sides of the containers on the deck of the trailer are simultaneously clamped or held down onto the deck of the trailer.

A further object of the invention is to provide a seed handling and dispensing apparatus of the type described wherein the doors which provide access to the slide gates of the containers are accessible from the driver's side of the trailer.

A further object of the invention is to provide a seed handling and dispensing apparatus of the type described including an improved means for pivoting the upper auger conveyor section relative to the upper auger conveyor section.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
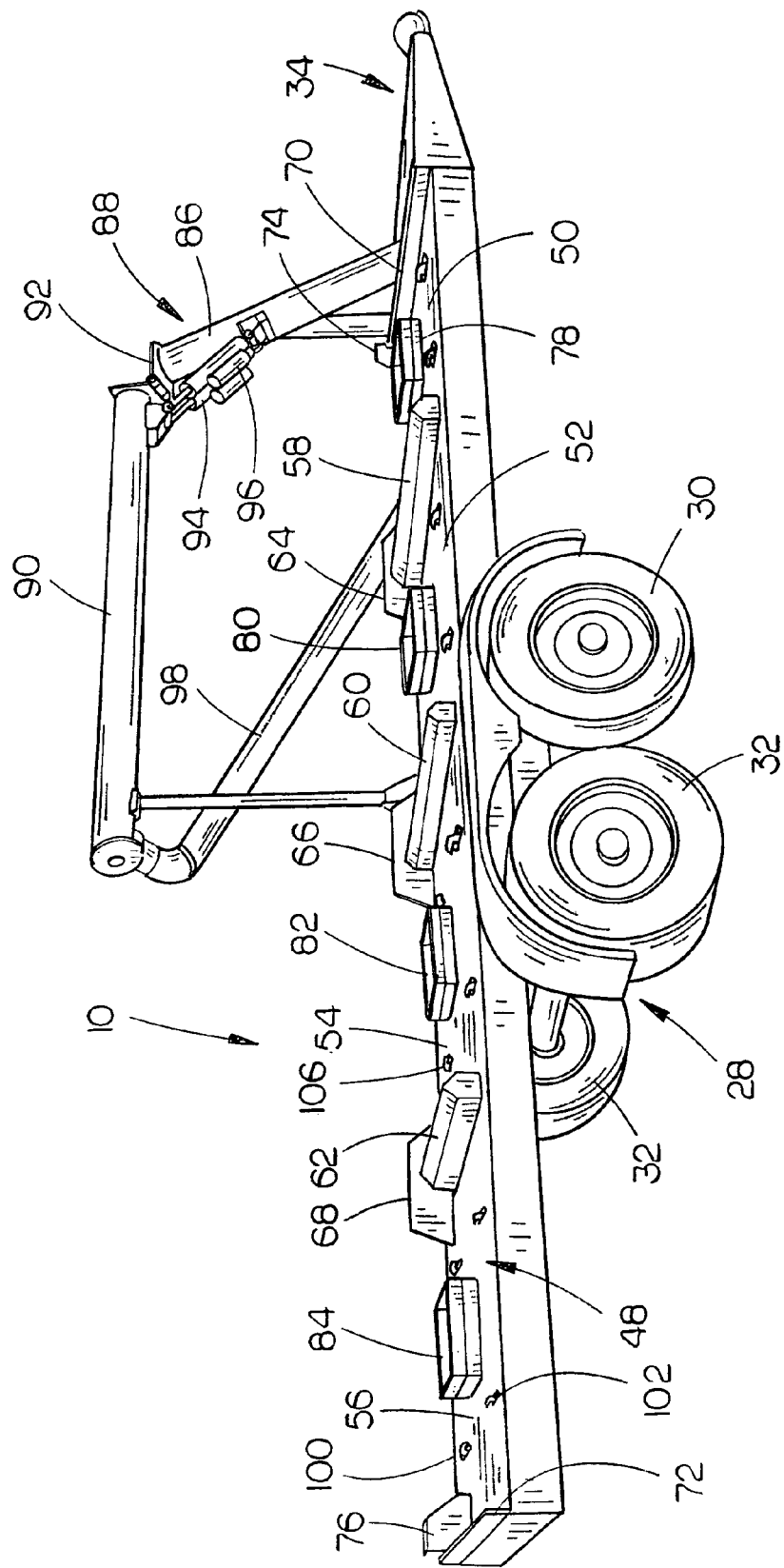
FIG. 1 is a perspective view of the seed handling and dispensing apparatus of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The seed dispensing cart, caddy, trailer, system or apparatus of this invention is generally designated by the reference numeral 10, which is designed for transporting bulk seed containers 12, 13, 14 and 15, which are normally identical to each other, and for dispensing the seed within the containers into seed boxes or hoppers of planting equipment such as row crop planters or grain drills. The containers 12, 13, 14, and 15 are sometimes referred to as totes and are readily available from one or more manufacturers. The containers are usually constructed of plastic. Each of the containers or totes 12, 13, 14 and 15 include a sloped floor 16 so that the seed therein will gradually flow to the discharge opening 18 which is selectively closed by a manually operated slide gate 20 which is accessible from one side of the container 12 through an opening 22 at one side thereof. The openings 22 of the containers are accessible from the driver's side of the apparatus. Each of the containers includes lower end portions or feet 24 and 26 at the sides thereof. In some cases, the feet 24 and 26 are created by pockets or the like formed in the lower ends of the containers.

The seed cart, caddy, apparatus, system or trailer will be referred to herein for purposes of description, as a "trailer".

Trailer 10 includes a wheeled frame 28 supported by wheels 30 and 32 at each side thereof. Preferably, the front wheels 30 include brakes. A forwardly extending tongue or hitch 34 is provided on the wheeled frame 28 so that the trailer may be towed by a prime mover such as a truck, pickup, tractor, etc. An internal combustion engine 36 is mounted on the wheeled frame 28 for powering the conveyor augers such as described in U.S. Pat. Nos. 6,971,324 and 6,994,039. It is preferred that an internal combustion engine 36 be utilized but the power source for the conveyor augers could be electrically driven, hydraulically driven or combinations thereof. Further, if the trailer 10 is being pulled by a tractor or the like, the source of power for the conveyor augers could be tractor power-take-off (PTO).

For purposes of description, the trailer 10 will be described as having a forward end 40, a rearward end 42, a left side 44 and a right side 46. Trailer 10 is provided with a generally horizontally disposed deck 48 which defines deck portions 50, 52, 54 and 56. Deck portions 50 and 52 are separated by an upstanding and elongated support 58 while deck portions 52 and 54 are separated by an elongated upstanding support 60. Deck portions 54 and 56 are separated by an elongated upstanding support 62. Upstanding plates 64, 66 and 68 are positioned at the left sides of the members 58, 60 and 62 respectively to prevent movement of the containers to the left when they are positioned on the deck 48. A front stop or wall 70 is provided at the forward end of deck portion 50 while a stop or wall 72 is provided at the rearward end of deck portion 56. A plate 74 is positioned at the left end of wall 70 while plate 76 is positioned at the left end of wall 72.

Front deck portion 50 is provided with a seed inlet opening 78 which is in communication with the discharge opening 18 of container 12. Similarly, seed inlet openings 80, 82 and 84 are provided on the deck portions 52, 54 and 56 respectively with those openings being in communication with the discharge openings in the containers 13, 14 and 15 respectively. The lower ends of the seed inlet openings 78, 80, 82 and 84 are in communication with an elongated auger system as disclosed in U.S. Pat. No. 6,994,039, which is incorporated herein by reference to complete the disclosure hereof. The forward end of the floor auger or conveyor is in communication with a lower auger section 86 of a conveyor screw auger 88. The conveyor screw auger 88 also includes an upper auger section 90 which is selectively pivotally secured to the upper end of auger section 86 by a hinge 92. A pair of hydraulic cylinders 94 and 96 are pivotally connected to and extend between the auger sections 86 and 90 for pivotally moving auger section 90 from the folded position of FIG. 1 to a position wherein it extends from auger section 86 in a parallel manner. The numeral 98 refers to a discharge chute which is movably secured to the upper end of auger section 90. The conveyor auger 88 is powered by the internal combustion engine 36 in the same manner as described in U.S. Pat. No. 6,994,039, the disclosure of which is incorporated herein by reference to complete this disclosure.

In the prior art, the seed containers were slid onto the deck portions from one side thereof so as to pass over the inlet openings on the deck portions. However, as the seed containers are slidably moved over the inlet openings, the inlet openings are frequently damaged. Thus, in this invention, the seed containers are lowered directly from above onto the seed inlet openings so that the inlet openings are not damaged during the positioning of the containers on the deck and the removal of the containers from the deck.

Figure 2:
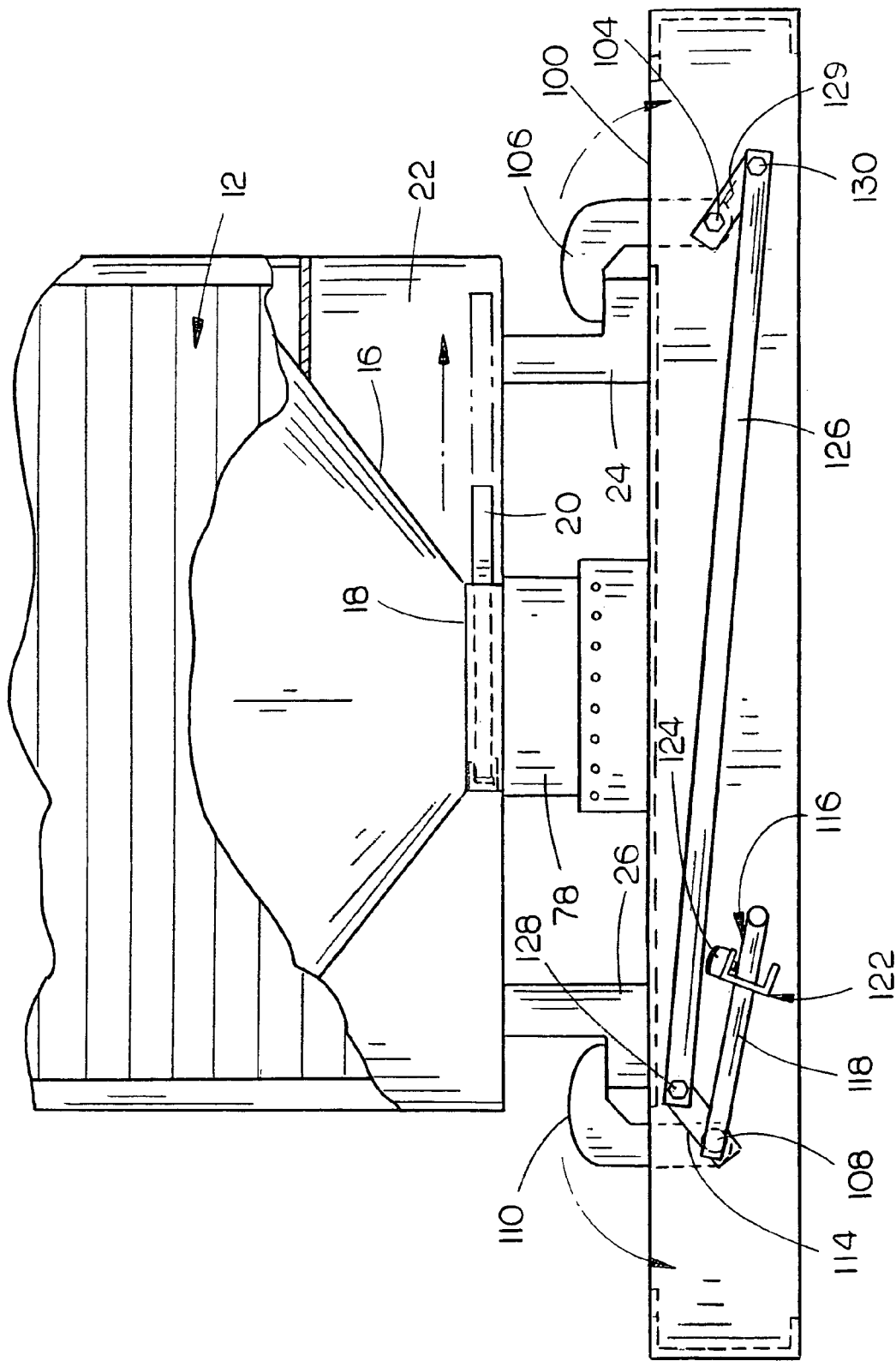
FIG. 2 is a front elevational view of the deck of the seed handling and dispensing apparatus with portions thereof cutaway to more fully illustrate the invention.

Each of the deck portions 50, 52, 54 and 56 are provided with a pair of elongated slots or openings 100 formed therein inwardly of the left side thereof. Each of the deck portions 50, 52, 54 and 56 are also provided with a pair of elongated slots or openings 102 formed therein inwardly of the right side thereof. An elongated shaft or rod 104 extends longitudinally beneath the deck 48 and is suitably rotatably secured thereto about its longitudinal axis. A plurality of generally L-shaped or hook-shaped hold-down members 106 are secured to the shaft 104 so as to be movable therewith. The shaft 104, as will be described hereinafter, is rotatable from a first position wherein the hold-down members 106 do not protrude upwardly through the openings 100 to a position wherein the hold-down members 106 protrude upwardly through the opening 100 for engagement with the feet 24 of the containers to hold down the containers on the deck 48 against movement. Similarly, a longitudinally extending shaft 108 is positioned beneath deck 48 inwardly of side 46 and has a plurality of spaced-apart hold-down members secured thereto for movement therewith. The hold-down members 110 may be moved upwardly through the slots 102 in the same fashion as hold-down members 106 are movable with respect to the openings 100. The hold-down members 110 are adapted to engage the feet or the container associated therewith as illustrated in FIG. 2.

Figure 3:
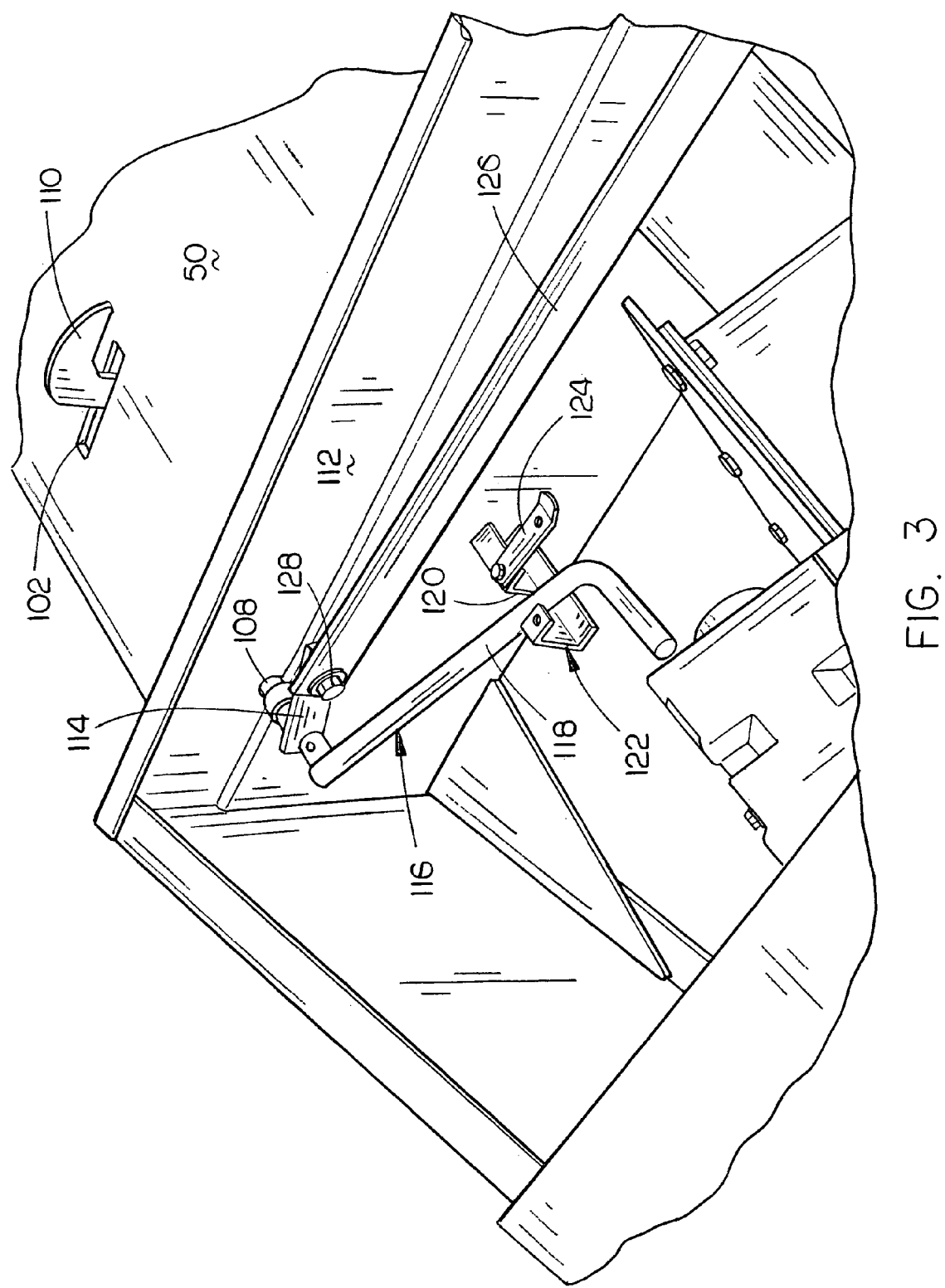
FIG. 3 is a perspective view which illustrates a portion of the means for simultaneously moving the hold-down members at each side of the trailer between their stowed positions below the deck and the operative positions.
Figure 4:
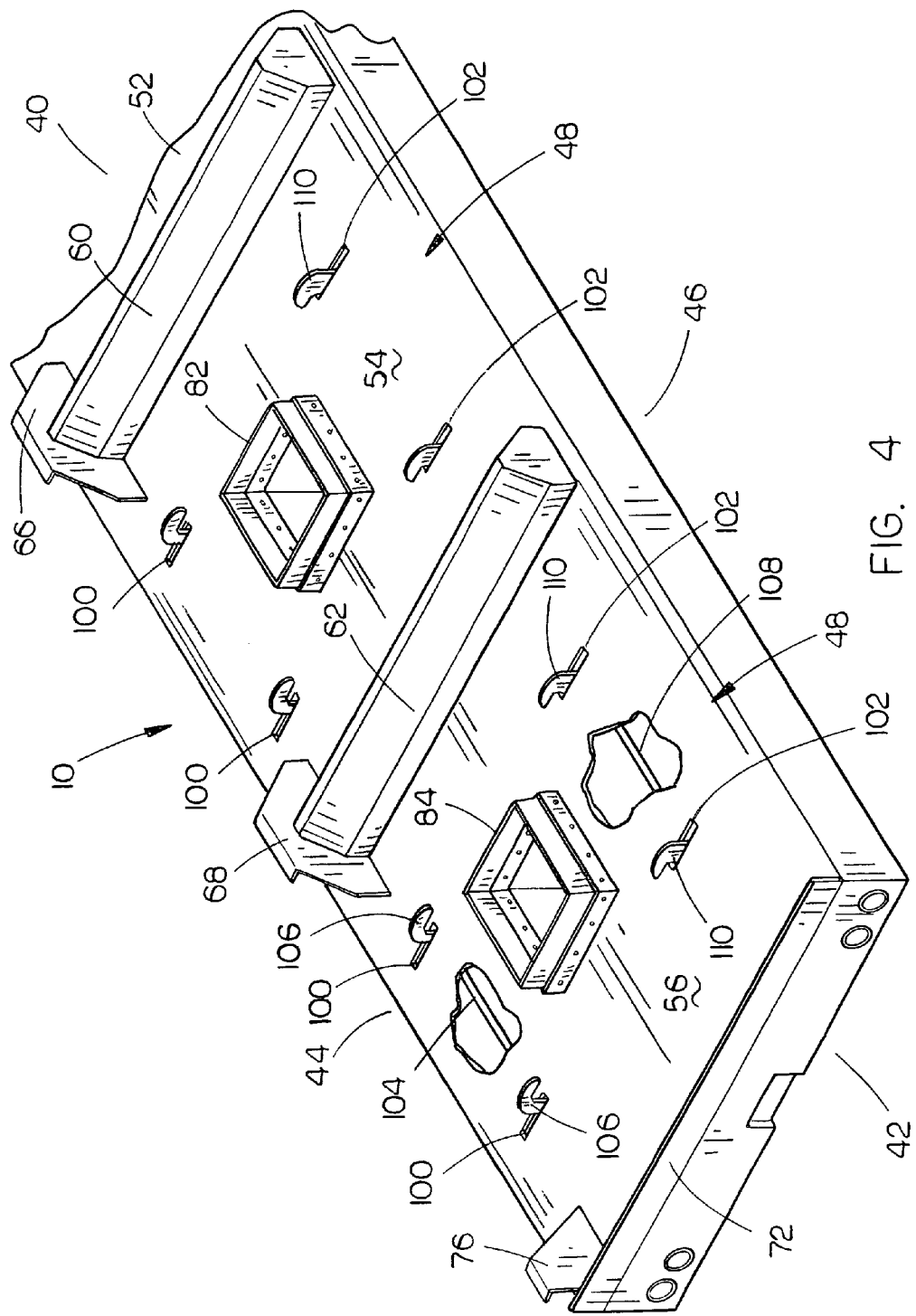
FIG. 4 is a partial rear perspective view of the deck of the apparatus with portions thereof cutaway to more fully illustrate the invention.
Figure 5:
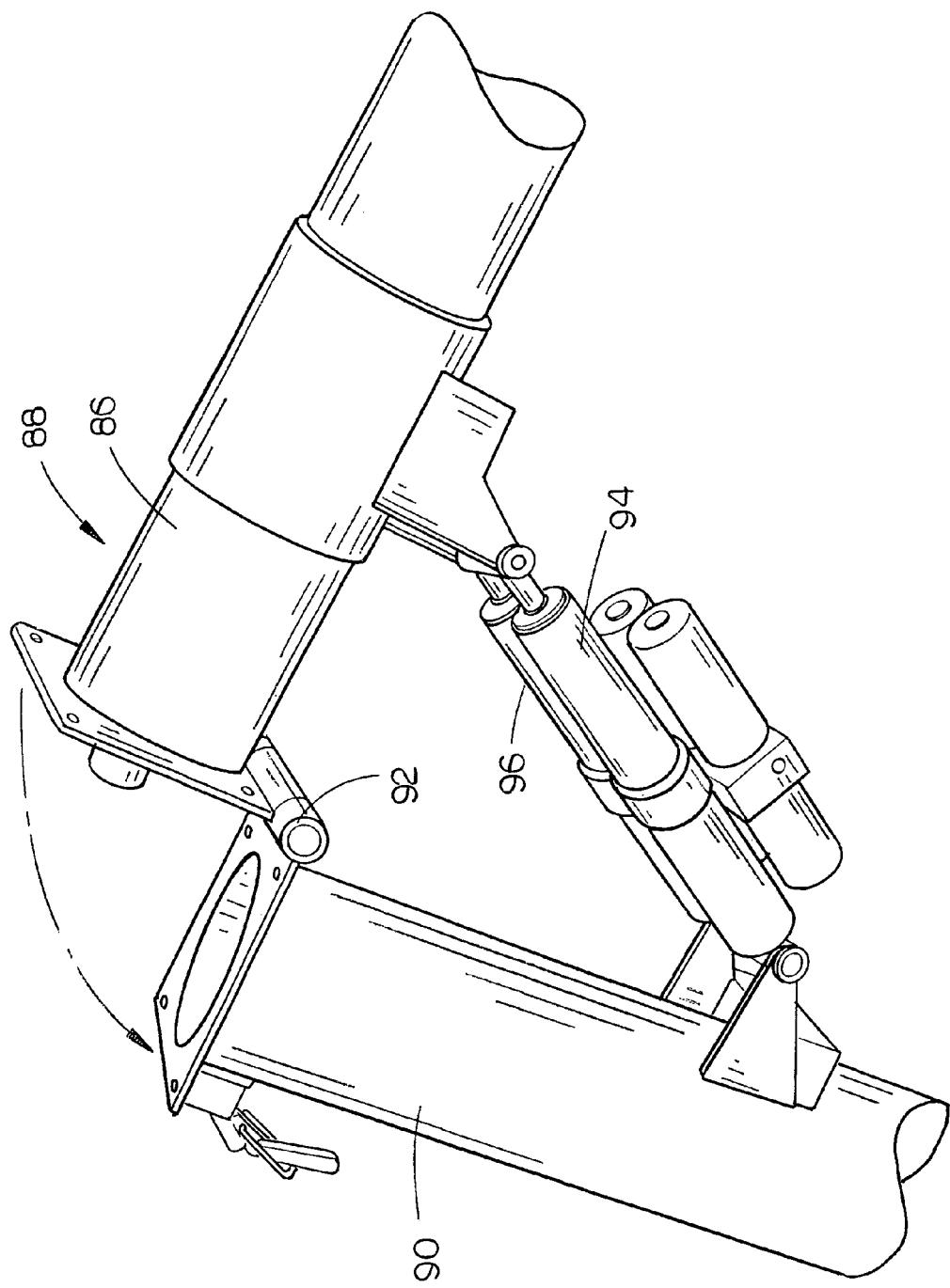
FIG. 5 is a perspective view illustrating the pair of cylinders which pivotally secure the upper auger conveyor section to the lower auger conveyor section to pivotally move the upper auger conveyor section relative to the lower auger conveyor section.
Figure 6:
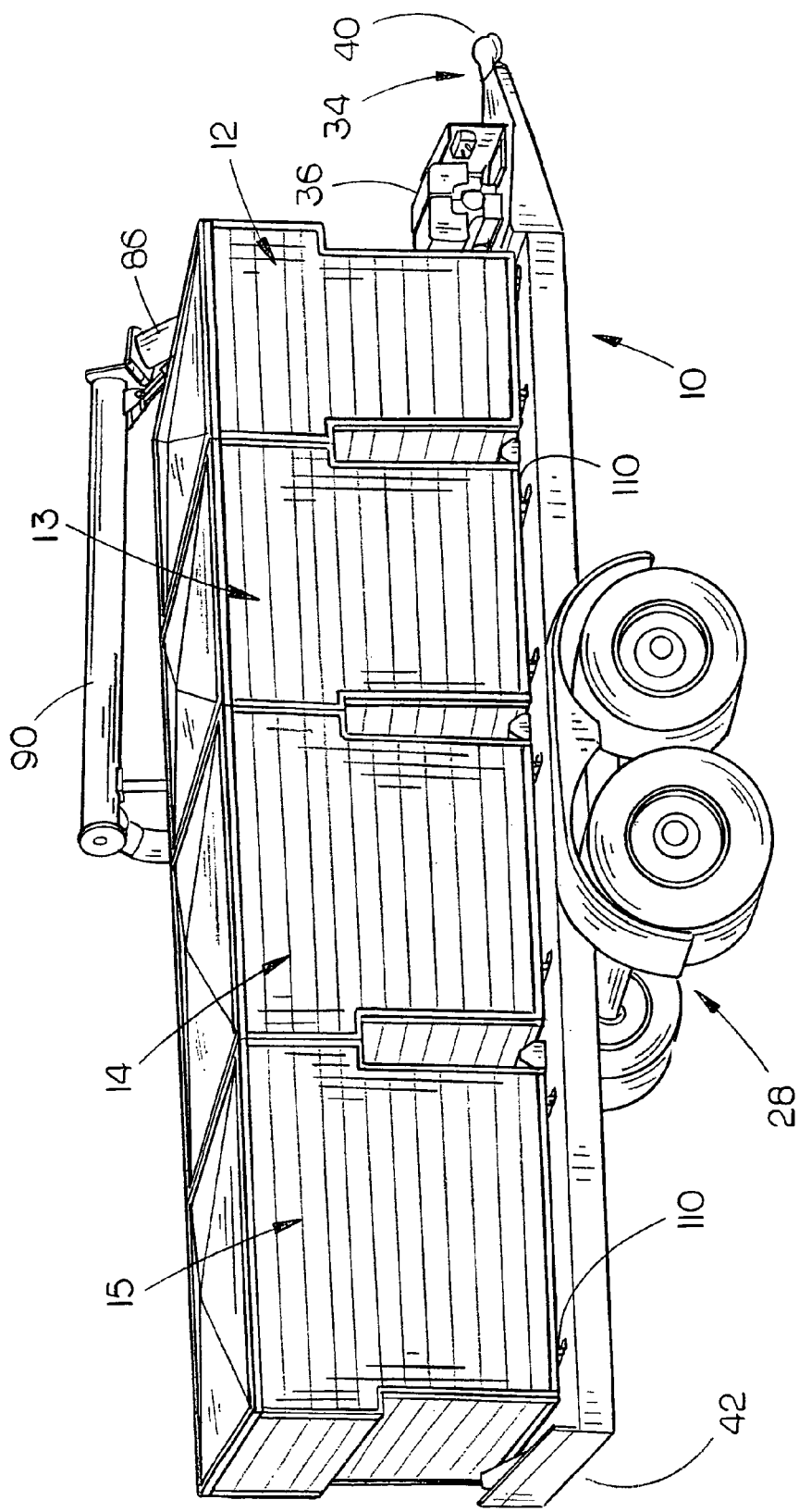
FIG. 6 is a rear perspective view of the apparatus of this invention having seed containers or totes mounted thereon.

As seen in FIG. 3, the forward end of shaft 108 protrudes forwardly from a bulkhead 112 at the forward end of deck portion 50. A link 14 has one end thereof welded to the forward end of shaft 108 so as to extend transversely therefrom. The numeral 116 refers to a crank having one end thereof secured to the forward end of shaft 108. The shank portion 118 of crank 116 is adapted to be received within a slot 120 formed in channel 122 as seen in FIG. 3. When the shank portion 118 is received within the slot 120, the same may be locked therein by pivotally moving the locking lever 124 from the position illustrated in FIG. 3 to a position over the upper end of the slot 120 and secured thereto to prevent the crank 116 from moving from the position illustrated in FIG. 3.

One end of an elongated bar 126 is pivotally secured to the outer end of link 114 by bolt or pin 128. The other end of bar 126 is pivotally secured to the outer end of a link 129 at 130 as seen in FIG. 2. Link 129 is welded to the forward end of shaft 104. Thus, when the crank 116 is in the position of FIG. 2, the hold-down members 106 and 110 will be in engagement with the lower ends of the seed containers. When it is desired to remove the seed containers from the trailer, the locking lever 124 is pivotally moved to its open position and the crank 116 is pivotally moved from the position of FIG. 2 to an upper position so that the hold-down members 106 and 110 pivotally move from the holding or clamping position to a position below the deck which is illustrated by the broken line arrows in FIG. 2. The seed container may then be raised from the deck 48 by a fork lift, crane, etc. When it is desired to install a filled seed container on the deck, the crank 116 will be rotated which causes the shafts 104 and 108 to pivotally move the hold-down members 106 and 110 from their stowed or stored position to the clamping or holding position of FIG. 2.

Thus it can be seen that a novel seed dispensing cart, caddy, trailer, system or apparatus 10 has been provided which represents a distinct improvement over the prior art. First, by being able to directly lower the seed containers onto the deck without sliding the same over the seed inlet openings, damage to the seed inlet openings is prevented. Further, by arranging the containers on the deck so that the gates 20 may be accessed from the driver's side of the trailer makes the opening and closing of the gates 20 a more simple step than having to reach between the containers in an attempt to open the slide gates 20. Further, the left and right sides of the containers are able to be secured to the deck simultaneously from the forward end of the deck through the use of the crank 116. Additionally, the use of two hydraulic cylinders 94 and 96 to pivotally move the auger section 90 with respect to the auger section 86 makes for a more smoother and more stable pivoting operation.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
a first bulk seed container, having upper and lower ends, a first side and a second side;
said first bulk seed container having a first horizontally disposed foot portion at said first side thereof at said lower end thereof;
said first bulk seed container having a second horizontally disposed foot portion at said second side thereof at said lower end thereof;
said first bulk seed container having a seed discharge opening at said lower end thereof;
a second bulk seed container having upper and lower ends, a first side and a second side;
said second bulk seed container having a first horizontally disposed foot portion at said first side thereof at said lower end thereof;
said second bulk seed container having a second horizontally disposed portion at said second side thereof at said lower end thereof;
said second bulk seed container having a seed discharge opening at said lower end thereof;
a seed handling and dispensing trailer for transporting said first and second bulk seed containers and for dispensing the seed within the containers into planting equipment;
said trailer comprising:
a wheeled frame having a forward end, a rearward end, and first and second sides;
said wheeled frame having a forwardly extending hitch for connection to a prime mover;
a generally horizontally disposed deck, having a forward end, a rearward end, a first side and a second side, provided on said wheeled frame defining at least a front deck portion and a rear deck portion;
said front deck portion having first horizontally spaced-apart front and rear hold-down openings formed therein inwardly of said first side of said deck;
said front deck portion having horizontally spaced-apart front and rear hold-down openings formed therein inwardly of said second side of said deck;
said rear deck portion having horizontally spaced-apart front and rear hold-down openings formed therein inwardly of said first side of said deck;
said rear deck portion having horizontally spaced-apart front and rear hold-down openings formed therein inwardly of said second side of said deck;
said front and rear hold-down openings of said front deck portion at said first side of said deck being aligned with said front and rear hold-down openings of said rear deck portion at said first side of said deck;
said front and rear hold-down openings of said front deck portion at said second side of said deck being aligned with said front and rear hold-down openings of said rear deck portion at said second side of said deck;

said front and rear hold-down openings at said first side of said deck being spaced from said front and rear hold-down openings at said second side of said deck;

each of said deck portions having a seed inlet opening provided thereon;

said front deck portion adapted to have said first bulk seed container positioned thereof so that said seed discharge opening of said first bulk seed container communicates with said seed inlet opening of said first deck portion;

said rear deck portion adapted to have said second bulk seed container positioned thereon so that said seed discharge opening of said second bulk seed container communicates with said seed inlet opening of said rear deck portion;

a first horizontally disposed and rotatable shaft, having forward and rearward ends, positioned below said deck inwardly of said first side of said deck;

said first shaft extending at least partially between said forward and rearward ends of said deck;

said first shaft having a plurality of spaced-apart first hold-down members operatively secured thereto for movement therewith;

said first hold-down members being spaced on said first shaft so as to be aligned with said front and rear hold-down openings of said front and rear deck portions which are formed therein inwardly of said first side of said deck to permit said first hold-down members to extend thereinto;

each of said first hold-down members being generally L-shaped with first and second ends;

said first end of each of said first hold-down members being operatively secured to said first shaft;

each of said first hold-down members having a hook portion at said second end thereof;

said first shaft being rotatable to enable said first hold-down members to move between a first non-operative position and a second container hold-down position;

a second horizontally disposed and rotatable shaft, having forward and rearward ends, positioned below said deck inwardly of said second side of said deck;

said second shaft having a plurality of spaced-apart second hold-down members operatively secured thereto for movement therewith;

said second hold-down members being spaced on said second shaft so as to be aligned with said front and rear hold-down openings of said front and rear deck portions which are formed therein inwardly of said second side of said deck to permit said second hold-down members to extend thereinto;

each of said second hold-down members being generally L-shaped with inner and outer ends;

said inner end of each of said second hold-down members being operatively secured to said second shaft;

said outer end of each of said second hold-down members having a hook portion at said outer end thereof;

said second shaft being rotatable to enable said second hold-down members to move between a first non-operative position and a second container hold-down position;

said hook portions of said first hold-down members extending transversely with respect to said first side of said deck when in said second container hold-down position;

said hook portions of said second hold-down members extending transversely with respect to said second side of said deck when in said second container hold-down position;

said hook portions of said first hold-down members extending in a first direction when in said second container hold-down position;

said hook portions of said second hold-down members extending in a second direction when in said second container hold-down position which is opposite to said first direction;

said hook portions of said first hold-down members, when said first hold-down members are in said second container hold-down position, extending over and engaging said first foot portions of said first and second bulk seed containers to secure said first foot portions of said first and second bulk seed containers to said front and rear deck portions respectively;

said hook portions of said second hold-down members, when said second hold-down members are in said second container hold-down position, extending over and engaging said second foot portions of said first and second bulk seed containers to secure said second foot portions of said first and second bulk seed containers to said front and rear deck portions respectively.

2. The combination of claim 1 wherein said first and second shafts are interconnected so that they may be rotated in unison in opposite directions.

3. The combination of claim 1 wherein a first link member is secured to said first shaft, a second link member is secured to said second shaft, a third link member is rotatably secured to said first and second link members and extends therebetween, and wherein a handle is secured to one of said first and second shafts whereby movement of said handle causes simultaneous rotation of said first and second shafts in opposite directions to move said hold-down members between their said container hold-down and inoperative positions.

4. The combination of claim 3 wherein means is provided for selectively locking said handle in a position wherein said hold-down members are in their said second container hold-down positions.

5. The combination of claim 3 wherein said handle is a crank handle.

6. The combination of claim 3 wherein said handle is secured to said forward end of said second shaft.

7. The combination of claim 1 wherein each of said front and rear hold-down openings are rectangular with the longitudinal lengths thereof being transversely disposed with respect to said first and second sides of said deck.

8. The combination of claim 1 wherein said hold-down members are disposed below said deck when in said first non-operative position.

9. A seed handling and dispensing apparatus for transporting a bulk seed container having upper and lower ends, a first side, a second side, a first horizontally disposed foot portion at the first side thereof at the lower end thereof and a second horizontally disposed foot portion at the second side thereof at the lower end thereof, comprising:

a wheeled frame having a forward end, a rearward end, and first and second sides;

said wheeled frame having a forwardly extending hitch for connection to a prime mover;

a generally horizontally disposed deck, having a forward end, a rearward end, a first side and a second side, provided on said wheeled frame;

said deck having horizontally spaced-apart front and rear hold-down openings formed therein inwardly of said first side of said deck;

said deck having horizontally spaced-apart front and rear hold-down openings formed therein inwardly of said second side of said deck;

said hold-down openings at said first side of said deck being spaced from said hold-down openings at said second side of said deck;

said deck having a seed inlet opening provided thereon;

said deck adapted to have a bulk seed container positioned thereon so as to communicate with said seed inlet opening;

a first horizontally disposed and rotatable shaft, having forward and rearward ends, positioned below said deck inwardly of said first side of said wheeled frame;

said first shaft having a plurality of spaced-apart first hold-down members operatively secured thereto for movement therewith;

said first hold-down members being spaced on said first shaft so as to be aligned with said front and rear hold-down openings of said deck which are formed therein inwardly of said first side of said deck to permit said first hold-down members to extend thereinto;

each of said first hold-down members having and second ends;

said first end of each of said first hold-down members being operatively secured to said first shaft;

each of said first hold-down members having a hook portion at said second end thereof;

said first shaft being rotatable to enable said first hold-down members to move between a first non-operative position and a second container hold-down position;

a second horizontally disposed and rotatable shaft, having forward and rearward ends, positioned below said deck inwardly of said second side of said wheeled frame;

said second shaft having a plurality of spaced-apart second hold-down members operatively secured thereto for movement therewith;

said second hold-down members being spaced on said second shaft so as to be aligned with said front and rear hold-down openings of said deck which are formed therein inwardly of said second side of said deck to permit said second hold-down members to extend thereinto;

each of said second hold-down members having first and second ends;

said first end of each of said second hold-down members being operatively secured to said second shaft;

each of said second hold-down members having a hook portion at said second end thereof;

said second shaft being rotatable to enable said second hold-down members to move between a first non-operative position and a second container hold-down position;

said hook portions of said first hold-down members extending in a first direction when in said second container hold-down position;

said hook portions of said second hold-down members extending in a second direction when in said second container hold-down position which is opposite to said first direction;

said hook portions of said first and second hold-down members, when said first and second hold-down members are in said second container hold-down positions, engaging and extending over the foot portions of the container to prevent lateral movement of the container with respect to said deck and to prevent upward movement of the container with respect to said deck.

10. The combination of claim 9 wherein each of said hold-down openings are rectangular with the longitudinal length thereof being transversely disposed with respect to said first and second sides of said deck.

11. The combination of claim 9 wherein said hold-down members are disposed below said deck when in said first non-operative position.

* * * * *

UNITED STATES PATENT AND TRADEMARK OFFICE
CERTIFICATE OF CORRECTION

| | | |
|---|---|---|
| PATENT NO. | : 8,303,236 B2 | Page 1 of 1 |
| APPLICATION NO. | : 12/586941 | |
| DATED | : November 6, 2012 | |
| INVENTOR(S) | : Tom J. Beck | |

It is certified that error appears in the above-identified patent and that said Letters Patent is hereby corrected as shown below:

Column 9, line 25: Claim 9, line 25 should read "each of said first hold-down members having first and second ends;". Please insert the word --first-- after "having".

Signed and Sealed this
Fifth Day of March, 2013

Teresa Stanek Rea
*Acting Director of the United States Patent and Trademark Office*